(12) United States Patent
Lauzon et al.

(10) Patent No.: US 6,347,771 B1
(45) Date of Patent: Feb. 19, 2002

(54) PORTABLE ARM AND MOUSE SUPPORT FOR USE WITH PERSONAL COMPUTERS

(76) Inventors: Pierre Lauzon, 5601 N. Park Rd., Ft. Lauderdale, FL (US) 33312; Diane Sayre, 1-311 3rd Street, SE, Medicine Hat, Alberta (CA), T1A 4C7

( * ) Notice: Subject to any disclaimer, the term of this patent is extended or adjusted under 35 U.S.C. 154(b) by 0 days.

(21) Appl. No.: 09/588,340

(22) Filed: Jun. 6, 2000

Related U.S. Application Data

(60) Provisional application No. 60/138,602, filed on Jun. 11, 1999.

(51) Int. Cl.[7] .............................................. B43C 15/00
(52) U.S. Cl. ...................... 248/118; 248/918; 248/282.1
(58) Field of Search ........................... 248/118.5, 282.1, 248/278.1, 918

(56) References Cited

U.S. PATENT DOCUMENTS

| | | | |
|---|---|---|---|
| 790,217 A | * 5/1905 | Mason | |
| 1,812,744 A | * 6/1931 | Glenn | |
| 2,694,439 A | * 11/1954 | Murray | |
| 5,074,501 A | 12/1991 | Holtta | 248/118.3 |
| 5,201,485 A | 4/1993 | Moss et al. | 248/118 |
| 5,228,655 A | 7/1993 | Garcia et al. | 248/118 |
| 5,265,835 A | 11/1993 | Nash | 248/118 |
| 5,342,006 A | 8/1994 | Tice | 248/118 |
| 5,405,109 A | 4/1995 | Nordnes | 248/118.3 |
| 5,433,407 A | 7/1995 | Rice | 248/118.1 |
| 5,571,274 A | 11/1996 | Holstensson | 297/411.38 |
| 5,692,712 A | 12/1997 | Weinschenk, Jr. et al. | 248/118 |
| 5,727,759 A | 3/1998 | Christensen | 248/118 |
| 5,743,499 A | 4/1998 | Wang | 248/118 |
| 5,752,683 A | 5/1998 | Novis et al. | 248/118 |
| 5,833,180 A | * 11/1998 | Barauski | |
| 5,918,840 A | * 7/1999 | Christensen | |
| 5,975,469 A | * 11/1999 | Chen | |

* cited by examiner

*Primary Examiner*—Alvin Chin-Shue
(74) *Attorney, Agent, or Firm*—Tom Hamill, Jr.

(57) ABSTRACT

The present invention discloses a portable arm and mouse support device to be affixed to a desk proximal the keyboard of the computer. The invention supports the computer mouse and the lower arm as well as aligns the arm with the mouse in a horizontal fashion. The portable arm and computer arm support has three arm elements which are rotatably connected, permitting articulation with respect to one another, and a clamping means, designed to secure the device to a desk. The first arm includes a front portion, a rear portion, a top side and a bottom side. The second arm includes a front portion and a rear portion. The third arm includes a front portion and a rear portion, a top side and a bottom side. The third arm rear portion is rotatably affixed to a clamping means and the third arm front portion rotatably affixed to said second arm rear portion. The second arm front portion is rotatably affixed to said first arm rear portion. The first arm portion includes a first arm vertical element intermediate said first arm front portion and said first arm rear portion, causing said first arm front portion to be lower than said first arm rear portion. The first arm rear portion top side includes a cushioned element affixed thereto to support the computer user's arm. The first arm front portion top side is designed to receive a computer mouse thereon. By correct placement of the support device, the computer user's wrist and forearm reside atop the cushioned element leaving the hand in a natural position to use the mouse due to the vertical drop between the first arm rear portion and the first arm front portion.

4 Claims, 4 Drawing Sheets

PORTABLE ARM AND MOUSE SUPPORT FOR USE WITH PERSONAL COMPUTERS

This application claims benefit to Provisional Application No. 60/138,602 filed Jun. 11, 1999.

BACKGROUND OF THE INVENTION

Field of the Invention

The present invention relates generally to ergonomic devices for desktop computers to prevent repetitive motion disorders such as carpal tunnel syndrome. More particularly, the present invention discloses a portable arm and mouse support device to be affixed to a desk proximal the keyboard of the computer.

SUMMARY OF THE INVENTION

With the advent of mass personal computer usage, the incidence of repetitive injury disorders such as carpal tunnel syndrome is on the rise. As such, a need exists to find means to permit one to operate their computer in a comfortable and ergonomic fashion which will prevent such a disabling injury. To this end a portable arm and mouse support for use with personal computers is provided. The portable arm and mouse support is affixed to a desk or the like by a clamping device. The clamping device is a C-shaped element designed to receive the desk in between, and then be secured to the desk by a threaded bolt. This C-shaped element affixes to the desk in a fashion not dissimilar than a C-Clamp. The C-shaped element has a first side which engages the desk therebetween. The C-shaped element further includes a second side which secures a plurality of articulating segments in horizontal relation to the desk. Affixed to this second side of the clamp is a pair of elements in parallel relation designed to receive a third arm therebetween. The proximal end (rear portion) of the third arm is affixed to the pair of elements by a fastener which permits the third arm to rotate about the fixed axis of the fastener. The third arm element may be about 22 inches long and has a rear portion and a front portion. The rear portion extends to a third arm vertical element or step about 14 inches from the clamping device. The third arm vertical element is about 2 inches in height and raises the height of the front portion of the third arm element with respect to the rear portion of the third arm element by about that amount. The front portion of the third arm element extends about another 8 inches. The front portion of the third arm element is rotatably connected to a second arm rear portion. The second arm extends about 5-7 inches. The second arm front portion is in turn rotatably connected to a first arm front portion. The third arm about 18 inches long and also includes a front portion and a rear portion. The front portion extends to a first arm vertical element or step at about 12 inches from the end of the front portion of the first arm element. The front portion of the first arm element also includes a top flat portion. The top flat portion includes a cushioning element secured thereto. The cushioning element terminates at the first arm vertical element. The computer user's arm is designed to be received atop the cushioning element. The first arm vertical element lowers the height of the front portion of the first arm with respect to the rear portion of the first arm by about 1.25 inches. The front portion of the first arm element extends about 6 inches. The front portion of the first arm element includes a top flat portion. This top flat portion may have a specialized surface texturing to permit a trackball mouse to efficiently function thereon. The computer user would lie their forearm on the cushioned rear portion of the first arm, allow their wrist to hang over the first arm vertical element, where the hand may positively engage and control the mouse which lies atop the front portion of the first arm element. Each of the first arm element, second arm element and third arm element may have a width of about 5.5 inches. The dimensions of the portable arm and mouse support are for example only, and are in no way to be considered limiting. Other dimensions may be preferable and the above example in no way prejudices specific design and dimensional parameters.

It has been considered to manufacture the components of the portable arm and mouse support from aluminum, plastic, wood or any other material which has sufficient material properties to structurally support the arm and mouse proximal a computer. Other materials may be desirable and are considered within the scope of this discussion.

By employing the portable arm and mouse support, one alleviates or reduces upper body injury, aligns the arm with the mouse horizontally, (which eliminates the need to bend the arm in any way) and therefore helps reduce carpal tunnel syndrome and other associated repetitive motion disorders.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a portable arm and mouse support which permits the users forearm, wrist and hand to be in alignment when utilizing the computer mouse.

It is therefore an object of the present invention to provide a portable arm and mouse support which may be secured to a desk proximal a computer.

It is therefore an object of the present invention to provide a portable arm and mouse support which includes a plurality of arm elements, the arm elements being rotatably connected to each other, to permit the portable arm and mouse support to be placed in a comfortable position for any user preference.

It is therefore an object of the present invention to provide a portable arm and mouse support which includes a cushioning element for the forearm and a mouse pad or textured surface to receive the computer mouse.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

DESCRIPTION OF THE PREFERRED EMBODIMENTS

With reference now to the drawings, a portable arm and mouse support 10 is shown with salient features identified.

Figure 1:
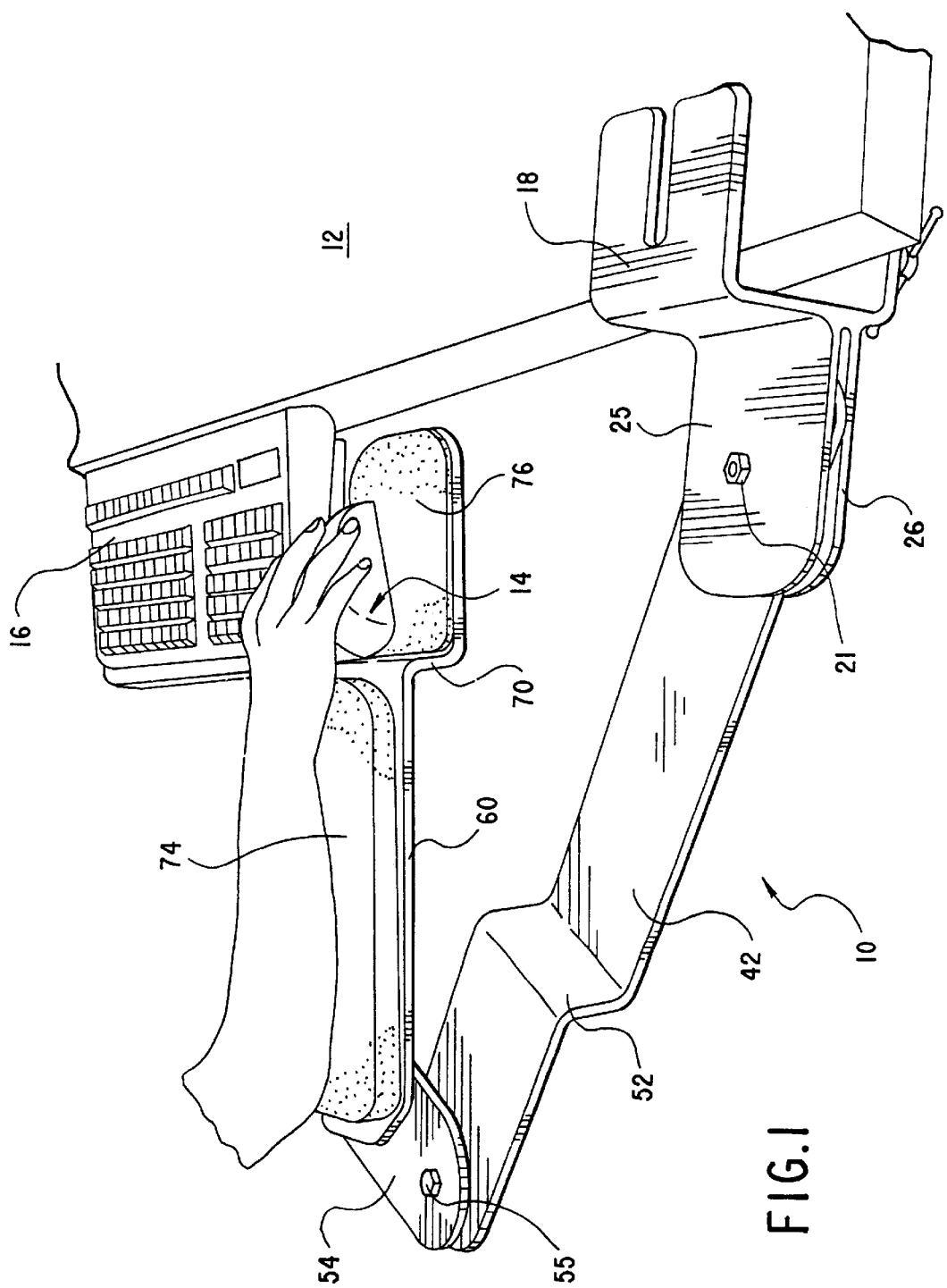
FIG. 1 is an perspective view of the portable arm and mouse support shown being employed by the user.
Figure 2:
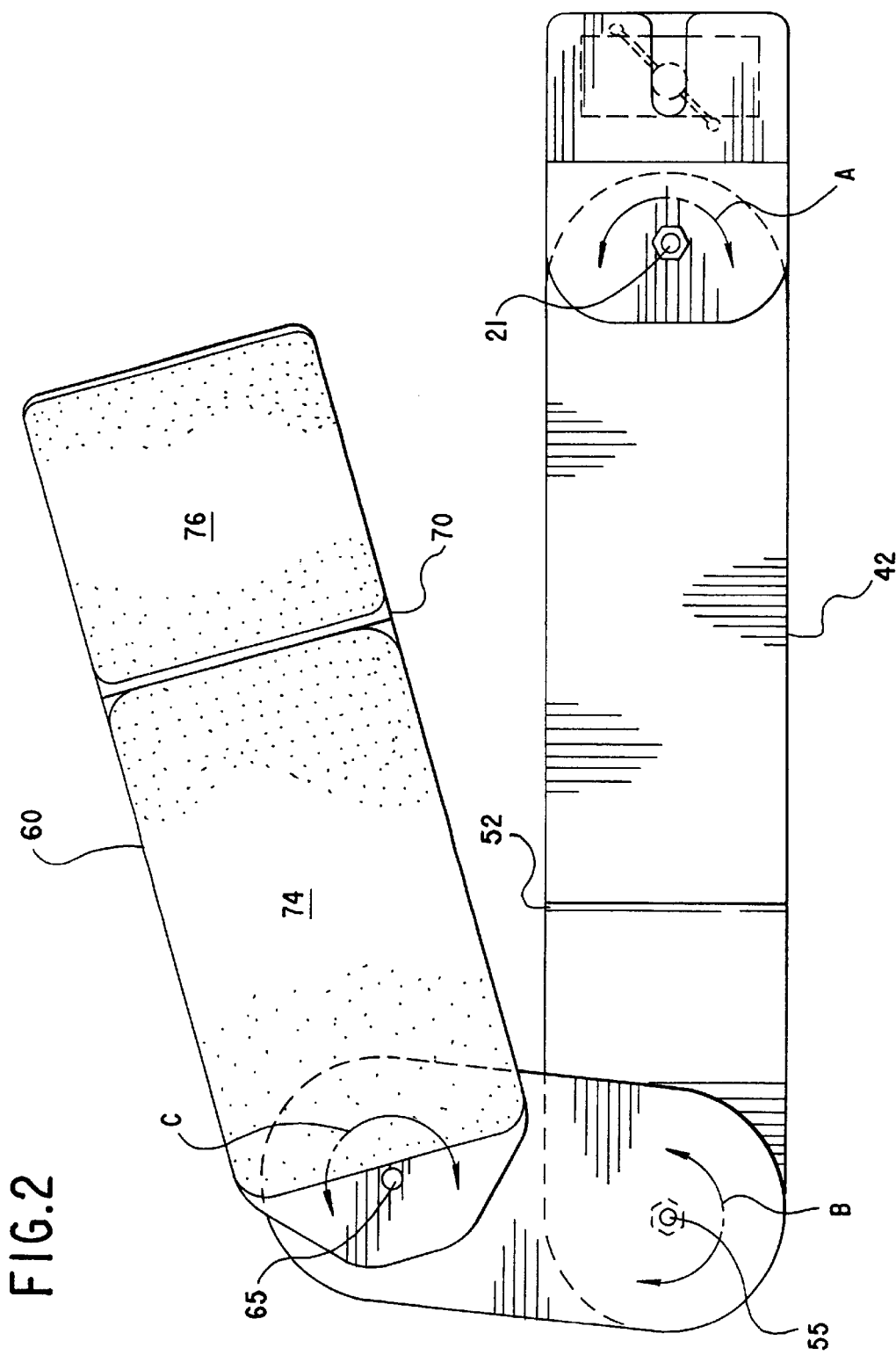
FIG. 2 is a top view of the portable arm and mouse support.
Figure 3:
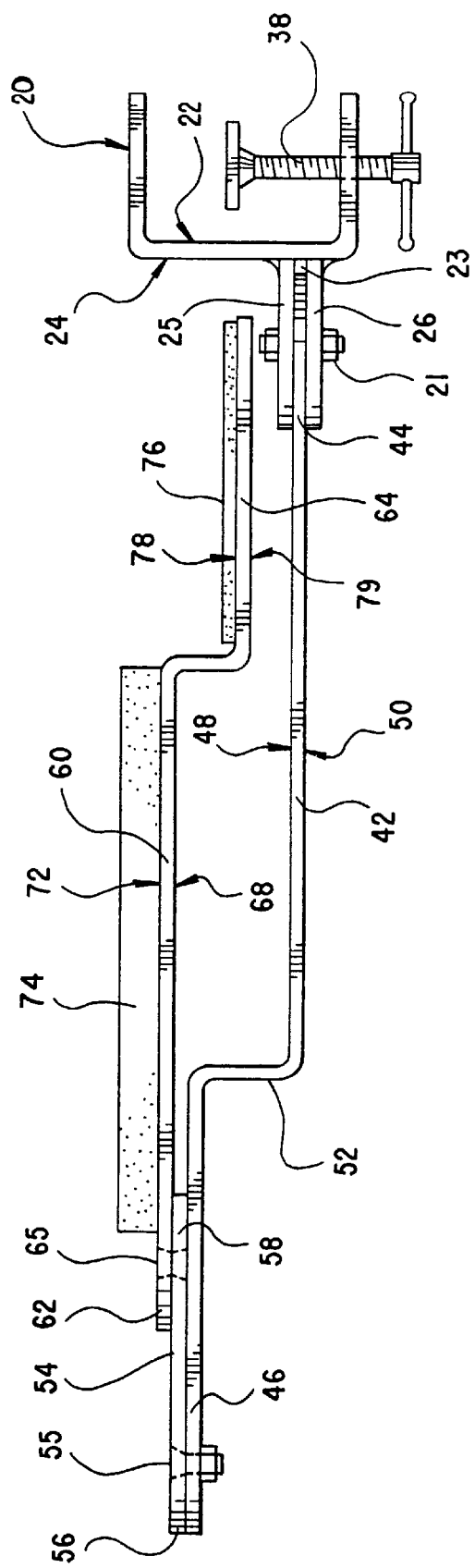
FIG. 3 is a side view of the portable arm and mouse support.
Figure 4:
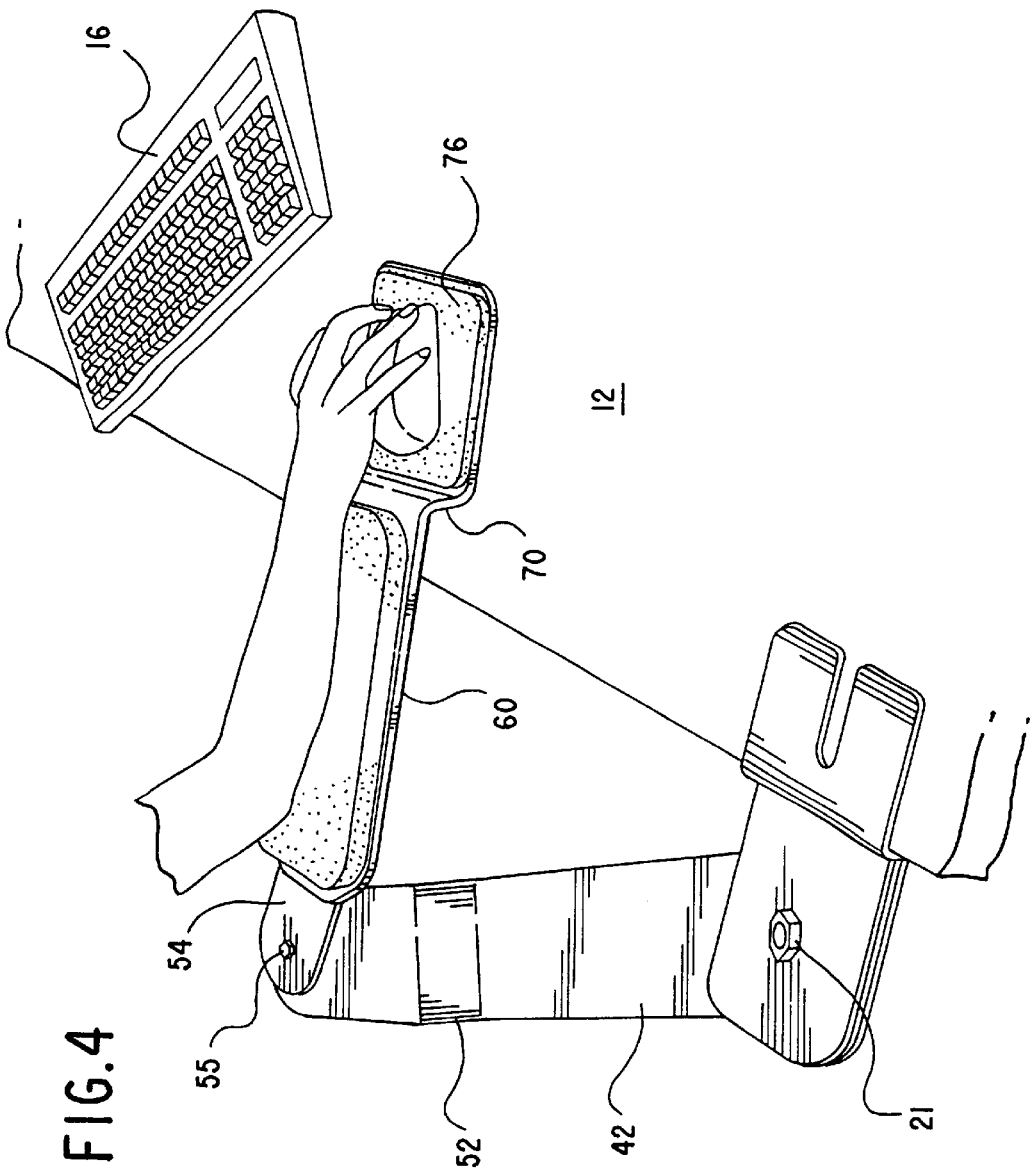
FIG. 4 is a perspective view of the portable arm and mouse support.

FIGS. 1–3 show the portable arm and mouse support 10. The portable arm and mouse support 10 is affixed to a desk 12 or the like by a clamping means 18. The clamping means 18 includes a c-shaped element 20. The c-shaped element 20 includes a c-shaped element desk side 22 designed to receive a desk or the like there between. A threaded member 38 may be adjusted to secure the clamping means 18 to the desk 12 or the like. Other means of securing the portable arm and mouse support 10 to the desk have been contemplated and are considered to be in the scope of this disclosure. These include, but are not limited to, camming devices, multiple threaded members, and the like.

The c-shaped element 20 further includes a c-shaped element user side 24. A generally rectangular top element 25 and a generally rectangular bottom element 26 are located in parallel relation and are secured to the c-shaped element user side 24 in a perpendicular relationship. The top element 25 and the bottom element 26 are integral with the c-shaped element user side 24 or may be secured thereto in any of a variety of conventional methods. Since the top element 25 and bottom element 26 are parallel, an opening 23 is formed intermediate the aforementioned top element 25 and bottom element 26.

A third arm 42 includes a third arm front portion 44, a third arm rear portion 46, a third arm top side 48, a third arm bottom side 50, and a third arm vertical element 52. The third arm 42 is a generally elongated rectangular element of a first dimension. The third arm vertical element 52 is located intermediate the third arm front portion 44 and the third arm rear portion 46. This has the effect of rendering the third arm front portion 44 to be in a lowered relation to the third arm rear portion 46.

A second arm 54 includes a second arm front portion 56 and a second arm rear portion 58. The second arm 54 is a generally elongated rectangular element of a second dimension.

A first arm 60 includes a first arm front portion 62, a first arm rear portion 64, a first arm top side 66, a first arm bottom side 68, and a first arm vertical element 70. The first arm 60 is a generally rectangular elongated element of a third dimension. The first arm vertical element 70 is located intermediate the first arm front portion 62 and the first arm rear portion 64. This has the effect of rendering the first arm rear portion 64 to be in a lowered relation to the first arm front portion 62. The first arm front portion top side 72 includes a cushioning element 74. The cushioning element 72 may be affixed to the first arm front portion top side 72 by any conventional means. The first arm rear portion top side 78 includes a textured surface 76. The textured surface 76 may be affixed to the first arm rear portion top side 78 by any conventional means or may be directly incorporated on that surface. This will permit a computer mouse 14 to operate in its preferred fashion. The first arm vertical element 70 is chosen to be of such a dimension so that the user may place their arm on the cushioning element 74 and operate a computer mouse which is provided atop the textured surface 76 whist having their forearm, wrist and hand in a co-linear arrangement. This will permit the user to employ the computer mouse 14 without having to lift or lower the user's wrist, avoiding repetitive motion disorders.

The third arm front portion 44 fits in between the opening 23 formed by the first top element 25 and the second top element 26. It is secured thereto by a first connection means 21 in such a fashion to permit the third arm 42 to pivot freely 180 degrees or more about the first connection means 21.

The third arm rear portion 46 is connected to the second arm front portion 56 by a second connection means 55 in such a fashion to permit the second arm 54 to pivot freely the second connection means 55.

The second arm rear portion 58 is connected to the first arm front portion 62 by a third connection means 65 is such a fashion to permit the first arm 60 to pivot freely about the third connection means 65.

The aforementioned use of the term generally rectangular includes a variety of geometric shapes and patterns, the perimeter of such termed surfaces may be rounded or of other ornamental configuration without departing from the contemplated invention.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. An apparatus to support the arm of a computer user and a mouse connected to the computer comprising:

a first arm, said first arm being generally rectangular and having a top side, an arm rest front portion and a mouse support rear portion, said first arm rear portion top side being lower than said first arm front portion top side, said first arm front portion being connected to said first arm rear portion by a first arm vertical portion, a third arm, said third arm being generally rectangular and having a top side, a front portion and a rear portion, said third arm front portion being lower than said third arm rear portion, said third arm front portion being connected to said third arm rear portion by a third arm vertical portion, a second arm, said second arm having a front portion and a rear portion, said second arm front portion rotatably connected to said third arm rear portion and said second arm rear portion rotatably connected to first arm front portion, said first arm vertical portion and said third arm vertical portion are chosen to be of such dimension that said first arm rear portion is below said third arm rear portion but preventing said first arm rear portion from contacting said third arm front portion when said first arm is rotated over said third arm, said third arm front portion rotatably affixed to a clamping assembly, whereby said computer user rests their forearm on said first arm front portion top side and their hand over said first arm rear portion top side, permitting the computer user to manipulate the mouse which is located atop said first arm rear portion top side.

2. An apparatus to support the arm of a computer user and a mouse connected to the computer as claimed in claim 1 wherein said first arm rear portion top side includes a textured surface, and said first arm front portion top side includes a cushioned portion, whereby the computer user's arm rests atop said cushioned portion and the computer user's hand rests on and is capable of moving the mouse, the mouse residing atop said textured surface, causing signals to be sent to the computer, the computer user's arm and hand being in a generally linear relationship, reducing strain on the computer user's arm and hand.

3. An apparatus to support the arm of a computer user and a mouse connected to the computer as claimed in claim 2 wherein said clamping assembly comprises an upper portion and a lower portion, said third arm being received intermediate said upper portion and said lower portion.

4. An apparatus to support the arm of a computer user and a mouse connected to the computer as claimed in claim 3 wherein clamping assembly further comprises said upper portion and said lower portion being connected perpendicularly to a U-shaped element, said U-shaped element including a clamp, said clamp to be connected to a support device selected from the group consisting of a desk, chair, computer workstation, table, shelf, and a horizontally disposed surface.

* * * * *